Nov. 28, 1950 W. E. TAIT ET AL 2,531,652
CAMERA
Filed Sept. 18, 1948 3 Sheets-Sheet 1
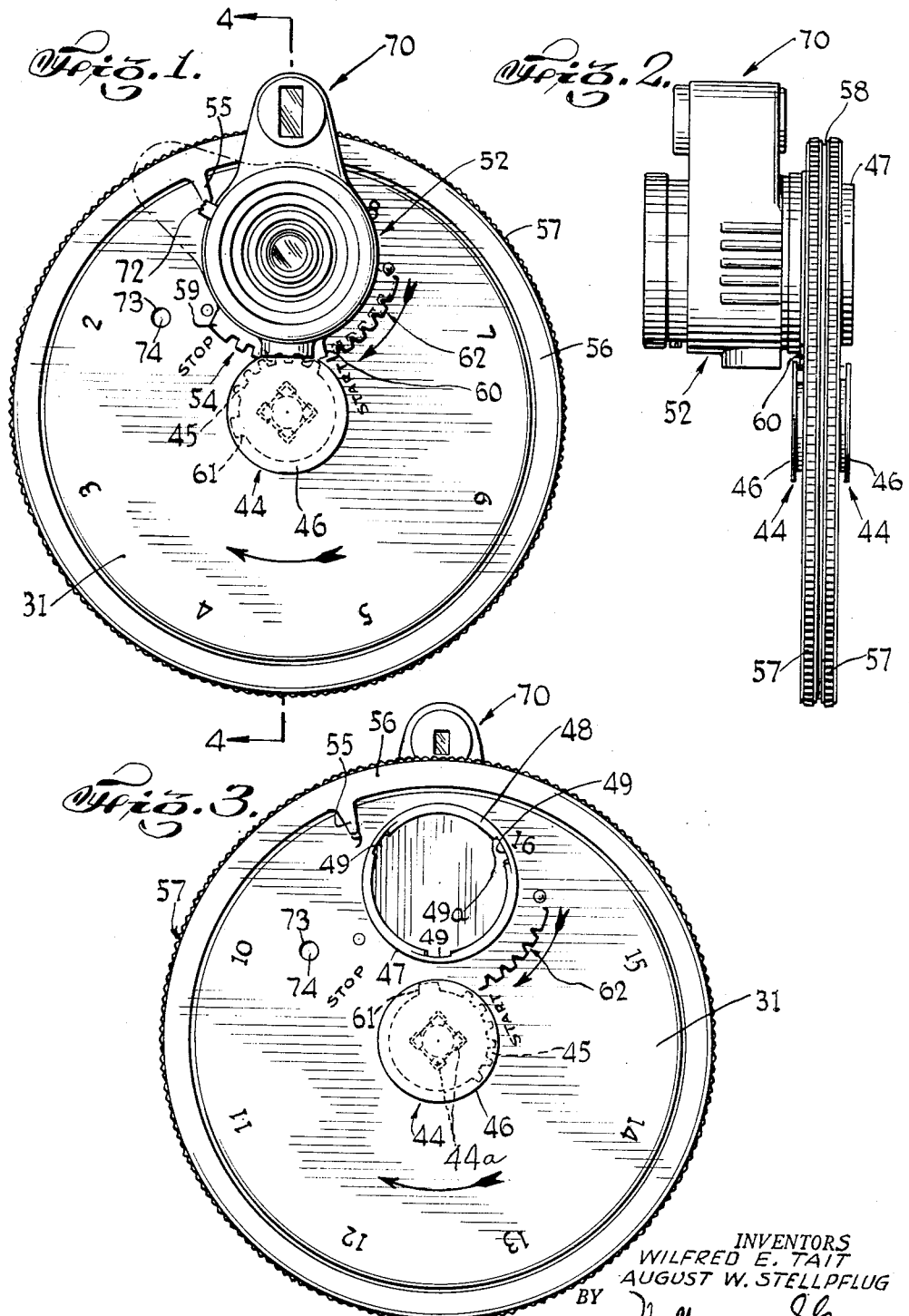
INVENTORS
WILFRED E. TAIT
AUGUST W. STELLPFLUG
BY
ATTORNEY

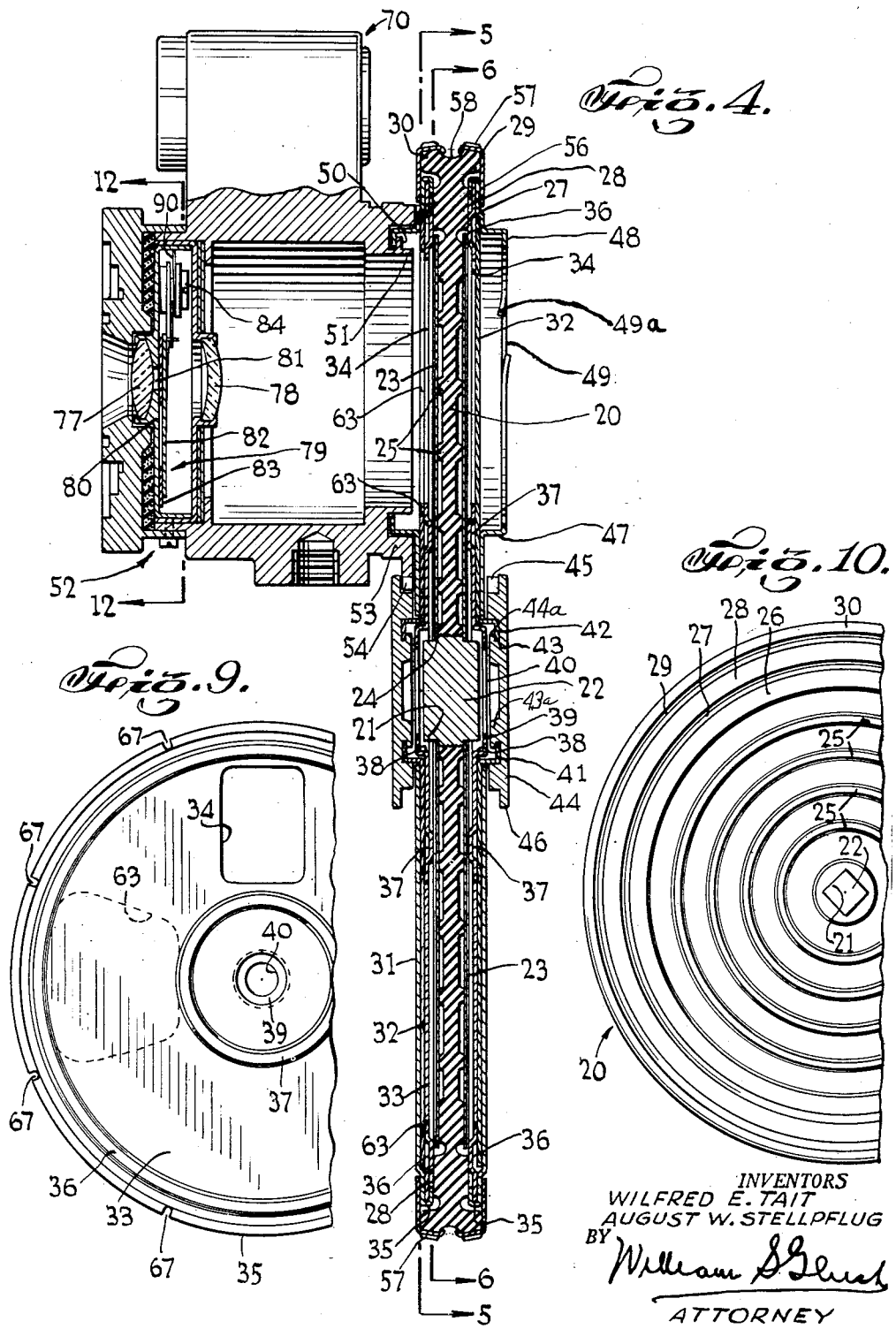

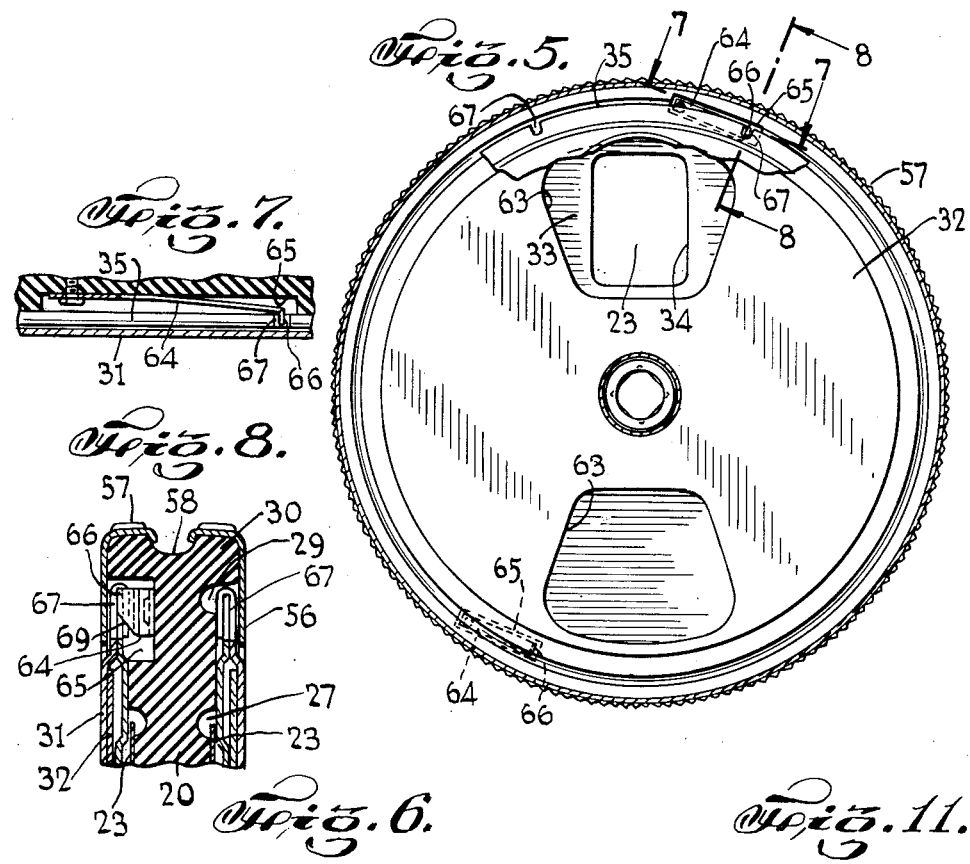
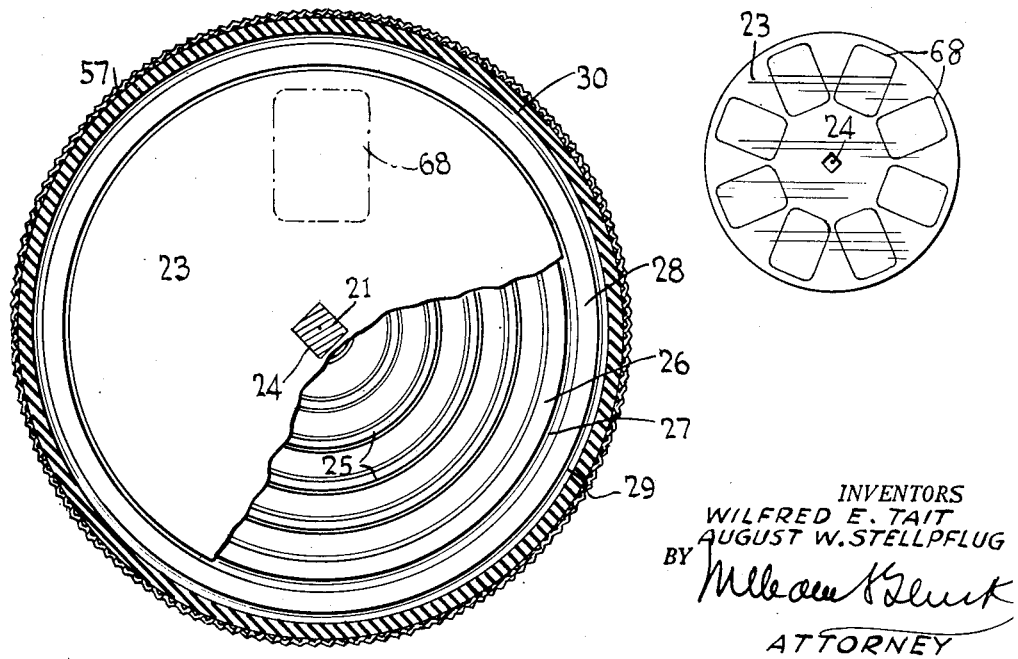
INVENTORS
WILFRED E. TAIT
AUGUST W. STELLPFLUG
ATTORNEY

Patented Nov. 28, 1950

2,531,652

UNITED STATES PATENT OFFICE 2,531,652

CAMERA

Wilfred E. Tait and August W. Stellpflug, New Canaan, Conn., assignors to American Safety Razor Corporation, Brooklyn, N. Y., a corporation of Virginia Application September 18, 1948, Serial No. 49,896

6 Claims. (Cl. 95—38)

The present invention relates to improvements in cameras and more particularly to a camera comprising a flat, lightweight body adapted to hold sensitized films at one or both sides thereof and for use with a lens assembly to produce a plurality of images in ring formation upon a sensitized film in said body. Said camera body includes at each face outside of a film therein, a front plate or lens carrier disc arranged to turn step by step about the axis of the ring area to be occupied by the exposures and having an opening therethrough and at the outside thereof a lens-assembly-receiving means around said opening. At the inner face of this member there is a shutter adapted to travel therewith and to be in closed position across said opening when the lens assembly is absent. At the inner side of said shutter is an image aperture plate having an aperture opposite said opening in the lens carrier plate or disc. Said image aperture plate is attached to the lens carrier plate and these plates or discs and the shutter therebetween constitute a front plate or front disc assembly. Installation of said lens system opens said shutter and removal of said lens assembly closes said shutter.

The camera is of a type wherein the camera body or film holder may be loaded in a dark room with one or more sensitized films. The loaded camera body may then be returned to the user or owner with the shutter or shutters closed. Each shutter will be opened by proper placing of the lens assembly and movement thereof to operative position. Upon completion of the exposures of frame areas on a sensitized film, the shutter at that side of the camera body, may be closed by removal of said lens assembly. The lens assembly may then be installed at the other side of the camera and a series of frame areas exposed on the corresponding film. After completion of the exposures of films, in said camera body and removal of said lens assembly, the camera body may be mailed or otherwise forwarded to a central developing and reloading laboratory. Then, prints from the exposed negatives and the freshly loaded camera body may be mailed to the user. The camera body being flat and constructed of light metal such as aluminum may be mailed in an envelope.

An important object of the invention is to provide a novel and advantageous camera of the general class specified and so designed as to enable economies in manufacture and operation. One factor in attaining these results is based upon the use of a single central baffle disc, to which the two side portions of the camera body are secured at opposite sides. Another factor resides in the use of annular grooves in the film supporting faces of said center baffle disc, thus lightening the disc and avoiding adherence of the films to the disc. Another factor resides in the holding of a film against turning with reference to the baffle disc by providing a suitably shaped projection from the center of the baffle disc which fits into a corresponding shaped opening at the center of the film.

Another object of the invention is to provide novel and advantageous means for securing to the central baffle disc, the camera parts at opposite sides thereof. To this end said baffle disc is recessed at each face to receive a front plate assembly and to provide a bead to surround the circumference of the front plate. Said baffle disc is also provided with a central channel or groove extending completely around its circumference. Each face plate assembly may be secured to the baffle disc by an outer ring or rim having a cylindrical portion fitting over the corresponding side of the circumference of the baffle disc and a flange extending over the outer face of the face plate at its circumference, the inner edge of said cylindrical portion being turned down into said groove. Each of these retaining rings may be knurled at its circumference to assist in holding the baffle disc while the face plate is being turned by means of the lens system.

Another object of the invention is to provide means for determining the particular part of the film over which the lens system is located. This object may be attained by providing numbered marks on the face plate and a pointer on the adjacent rim of a securing ring. Said pointer may be integral with the ring and used for tearing off the ring in a dark chamber.

Another object of the invention is to provide novel and advantageous means for accurately positioning a face plate for exposure of predetermined portions of a sensitized film. This object may be attained by providing novel and advantageous detent means effective for such positioning action.

Other features, objects and advantages will appear upon consideration of the following detailed description and of the drawings, in which:

Fig. 1 is a plan view of one face of a camera embodying the present invention, and with a lens system installed at said face;

Fig. 2 is a view in edge elevation of the camera structure illustrated in Fig. 1;

Fig. 3 is a plan view of the structure of Fig. 1 as seen from the rear;

Fig. 4 is a section taken along the line 4—4 of Fig. 1;

Fig. 5 is a section taken along the line 5—5 of Fig. 4, certain parts being broken away and the shutter being shown in open position;

Fig. 6 is a section taken along the line 6—6 of Fig. 4, certain parts being broken away;

Fig. 7 is a section on the line 7—7 of Fig. 5;

Fig. 8 is a section on the line 8—8 of Fig. 5;

Fig. 9 is a fragmentary view looking at the inner face of the aperture disc, the dotted line position of the adjacent shutter opening showing that the shutter is in closed position;

Fig. 10 is a fragmentary front view of the baffle disc;

Fig. 11 is a view illustrating the arrangement of the pictures on a developed film.

Referring to the drawings and particularly to Figs. 2, 4 and 8, it will be seen that the camera body comprises a central baffle disc 20 which serves as a foundation on which the other parts of the camera are supported. Said disc 20 may be made of any suitable material. Projections 21 are provided at opposite sides of the center of said disc. Said projections are so shaped in cross section that when fitted into corresponding openings in other members, any relative turning movement will be prevented. Preferably said projections 21 are parts of a plug 22, preferably of metal, embedded in the material of said disc 20 at its center. As illustrated projections 21 are of square cross section and extend inwardly to the surface of the disc 20.

When the camera is loaded, there is a circular sensitized film or film disc 23 at each side of said baffle disc 20. Also each of these films has a square central opening 24 receiving one of said square projections 21. Each film is supported by the plastic at the base of the corresponding projections and by circular ribs 25 projecting from the adjacent face of baffle disc 20 and spaced substantially at uniform distances along the radii thereof. Near its outer edge each film 23 is supported by a circular rib 26 of greater width than ribs 25. However, the edge of said film projects beyond said rib 26 and part way across a circular groove 27.

Just outside of the circular groove 27 on each side of the disc 20, is a circular rib 28 of considerable width and projecting outwardly to and beyond the plane of the tops of ribs 25 and 26 to an extent determined by the thickness of films 23. Outside of circular rib 28 is a circular groove 29 and outside of groove 29 is a bead 30 extending beyond the outer surface of circular rib 28 to an extent capable of accommodating a front or face plate assembly. Said beads 30 provide a wide rim for said disc 20. Said front plate assembly comprises a front plate 31, a shutter disc 32 against the inner face of said front plate, and an aperture plate 33 secured at its edge to said front plate 31 by folding the edge of said front plate back over the edge of said aperture plate which contains an aperture 34. This provides a fold 35 which is offset inwardly to such an extent that the plane of its outer surface is just inside the plane of the inner face of the main body of the front or face plate 31.

As will be explained more fully hereinafter, the face plate assembly is turned step by step through different positions for exposures over different areas of baffle disc 20, and the shutter disc is turned with reference to face plate 31 and aperture plate 33.

Said aperture plate 33 is provided near fold 35 with an annular corrugation or rib 36 projecting inwardly and having a flat top adapted to engage said rib 26 as well as overlying film 23 at the outer edge thereof, and also with another annular corrugation or rib 37, to engage said film along an annular path within a circle drawn with a radius less than the radial distance of the inner edge of aperture 34 from the axis thereof.

At its central portion, aperture plate 33 is formed with a cylindrical projection 38 extending outwardly beyond the outer end of the corresponding projection 21, and provided at its outer end with an inwardly extending annular flange 39 with a central opening 40 (Fig. 4) of a diameter somewhat less than the length of a diagonal of the square end of the projection 21.

Also the shutter disc 32 is formed at its central part with a cylindrical projection 41 enclosing projection 38 of the aperture disc or plate 33, and an outer end 42 for said projection having a square opening 43. Said cylindrical projection 41 extends through a central opening in face plate 31 and said square opening 43 fits over a square inward projection 43a of a head 44 and is secured thereto by peening the corners of projection 43a at its corners 44a (Fig. 3). Said head 44 comprises an arcuate set of teeth or rack 45, beneath a round cap 46. This arrangement facilitates the formation of the face plate 31, shutter disc 32 and aperture plate 33, as by stamping and their assembly.

The front or face plate 31 is provided with lens assembly holding means in the form of a cylindrical outward projection 47 having at its outer end a narrow inturned flange 48 provided at its edge with arcuate cutouts or notches 49 to receive corresponding projections 50 at the outside of tube 51 forming part of a lens assembly 52. In order to facilitate insertion and removal of projections 50, there is an inward bend 49a at one end of each notch 49 to guide a projection 50 into the notch when the lens assembly is turned in clockwise direction and to guide it out of the notch when the lens assembly is turned counter-clockwise.

Said lens-assembly 52 also includes an outer tube 53 of suitable material provided with a rack 54 comprising an arcuate set of teeth adapted for insertion beneath said cap 46 to mesh with said rack 45. When the lens assembly is placed in the cylindrical projection 47 with the forward end of rack 54 just clearing the cap 46 so that the rack can be moved under the same in a clockwise direction. A short clockwise turn of the lens-assembly will then lock it to said face plate 31 and shift the shutter disc to open position as will be described more fully hereinafter.

Said face plate 31 has marked thereon digits running from 1 through 8 at regular intervals to indicate, in connection with a pointer 55 fixed with respect to baffle disc 20, the angular position of the face plate assembly with reference to disc 20. Preferably said pointer is integral with a flange 56 of a retaining ring 57 having a knurled cylindrical part surrounding the adjacent half of the rim of said baffle disc 20. Said flange 56 engages the inwardly offset edge of said face plate 31 so that the outer face of said flange is flush with the outer surface of the central part of said face plate. Furthermore, the inner edge of said cylindrical portion of the retaining ring 57 is forced down into a groove 58 at the periphery of the baffle disc between the beads 30 at opposite faces of the disc. Thus the face plate assembly is securely connected to the baffle disc although it can be turned freely with respect thereto.

In view of the fact that a portion of the surface of the face plate 31 is covered by the lens assembly 52 when the latter is attached thereto, the digits are placed around the disc or plate 31 so that the digit indicating each position of the face plate and lens assembly will appear just to one side of the lens assembly (Fig. 1). Of course the pointer 55 must be positioned accordingly.

Included in the arcuate set of teeth comprising the rack 54 of the lens assembly is a broad starting tooth 59 and a broad stopping tooth 60, and included in the arcuate set of teeth of rack 45 fixed to the shutter disc 32, is a broad starting tooth 61. To enable easy and accurate registration between the gear teeth of the lens assembly and entrance of projections 50 into slots 49, the face plate or disc 31 may have marked thereon a replica 62 of the outline of the teeth on the lens assembly 52 when placed against the camera body and before the turning of the lens assembly to effective position.

Although Fig. 3 is a view of the opposite side of the camera body from that shown in Fig. 1, the normal positions of rack 54 including tooth 59 (Fig. 3) is, exactly the same as for the other face (Fig. 1) of the camera body or film holder when the lens assembly is absent. The shutter or shutter disc 32 is provided with two like apertures 63 (Fig. 5) each of which is considerably larger than the aperture 34 of the aperture disc or plate 33. Fig. 5 shows the shutter in open position but turning the lens assembly to removal position will shift the effective aperture 63 through 90° to the right or in a clockwise direction. The second aperture 63 is not used after connection of the shutter disc to the head 44 and the rack 45 associated therewith. However, either aperture 63 might have been made the effective one in originally assembling the parts.

Relative positioning of the face plate assembly with reference to the baffle plate 20 and an associated film must be accurate for all of the various exposure positions numbered 1 through 8. To this end a detent spring 64 is secured at its left end (Figs. 5 and 7) at the bottom of a recess or groove 65 in the baffle disc 20. The right end of the spring is urged upwardly and is provided with an outturned tooth 66, which is normally held against outward movement but as the face plate is turned clockwise in Figs. 1 and 5, is snapped into one of the various slots 67 in the folded over circumference of the face plate 31 and the circumference of the aperture plate 33.

When one of the slots 67 moves along to a position over outturned tooth 66, the face plate will be held definitely in position for an exposure on one of the frame areas 68 of a film disc 23. Although the face plate 31 is detained in this position, it is not locked and upon pressure to operate the front or face disc further, the detent will yield, particularly in view of the inclined edge 69 thereof, and the front plate assembly can be advanced to another position for film exposure.

As brought out hereinbefore, by placing the lens assembly or mounting 52 in position to cooperate with a lens-assembly holding device on a face plate 31 and giving it substantially a quarter turn in clockwise direction, the lens holder will be secured to said face or front plate 31, and shutter disc 32 will be turned to open position. At the same time a finder 70 on the lens assembly or mounting 52 is moved to a position where it can be used, just outside of the rim of baffle disc 20. This movement of the shutter disc 32 to open position does not cause exposure of an area on a film in the camera but makes possible an exposure on the film disc 23 back of the face assembly under control of a lens-assembly-shutter operated by a finger lever 72 when swung in a clockwise direction (Fig. 1).

To indicate when the shutter disc 32 is in open position, provision is made of a small circular opening 73 in face plate 31 and indicia such as a colored spot 74 on shutter disc 32 in a position to show through opening 73 when the shutter disc 32 is opened. In view of the fact that there are two apertures or openings 63, care must be taken to place the opening 73 in such a position that it will not be over one of said openings or apertures 63 when the shutter is open.

The face plate assemblies on opposite sides of disc 20 are identical except for the numbers indicating the positions of the face plate assemblies with reference to the disc 20. On one face plate 31 the indication numbers run from 1 to 8 inclusive, in a counter-clockwise direction, and on the other face plate the numbers run from 9 to 16 inclusive. Of course the number of positions may be varied in any suitable manner, as by changing the apparatus to make smaller individual pictures so as to provide a greater number of exposure areas in the ring on the film, or by increasing the radial distance of the ring of exposure areas from the center of each film disc 23.

Obviously, the first exposure should be made with the face plate 31 (bearing numerals 1 through 8) in the position corresponding to the numeral 1. After an exposure at the number 1 position, the lens assembly and face plate assembly are moved to the number 2 position and this practice is followed until exposures have been made at all of the eight positions. Then if the disc 20 is provided at its other face with a sensitized film disc with positions numbered 9 to 16 inclusive, the lens assembly 52 which has been removed from the face plate assembly at the first side of the disc 20 may be applied to the face plate assembly with positions 9 through 16 marked thereon. Preferably in loading the camera body, the front plate assemblies at opposite sides of disc 20 are so arranged that the numeral 1 at one side and the numeral 9 at the other side are directly opposite each other. Then when the first eight exposures have been made, the camera body may be turned about a vertical axis and the 9 position will be in the proper place for use.

When exposure at all of these positions have been made, the lens assembly may be removed, thus moving the shutter disc to closed position. The flat camera body or film holder may then be placed in an envelope and shipped to a central developing and reloading laboratory.

It should be noted that the loadings at opposite sides of the disc 20 are entirely independent of each other and that, when desired, one side only may be loaded. Of course the rings 57 provide a very simple and effective way of securing face plate assemblies to disc 20, and the pointers 55 on flanges 56 of the rings 57 provide simple and effective means for positioning the face plate assemblies at exposure positions.

Furthermore, the annular ribbed surfaces of the disc 20 make it easier to adjust the support of films 23 and avoid undue friction between a film 23 and the surface of the disc 20 and the aperture plate 33 at opposite sides thereof.

The replica 62 of the outline of the teeth on the lens assembly facilitates accurate positioning of the lens assembly for insertion of projections 50 of the lens assembly into notches 49 in flange 48 of the lens assembly holding means. If then the lens assembly is turned clockwise, the teeth of the rack 45 will pass under the cap 46 and the broad starting tooth 59 of rack 54 will engage broad starting tooth 61 of rack 45 of the shutter disc and bring the uniform teeth of racks 45 and 54 into mesh. The two racks will then move together until the broad stopping tooth 60 of rack 54 is engaged by a tooth of rack 45. At this time the lens assembly will be in its Fig. 1 position. As a further precaution, provision is made of a stop 75 to limit the clockwise movement of starting tooth 59 and a stop 76 to limit the counterclockwise movement of stopping tooth 60.

As shown in Figs. 1 and 4, the lens assembly comprises an outer lens 77 and an inner lens 78. Between these lenses is a shutter device 79 operated by said finger lever or piece 72. Also just outside of said shutter device is a partition or stop 80 having a circular aperture 81 at the inner reduced end of a round tapered hole through the stop.

It should be understood that various changes may be made and that various features may be used without others, without departing from the true spirit and scope of the invention.

What we claim is:

1. A film cassette for holding sensitized film in sheet form and adapted to expose successive areas of the film by rotational displacement of a closure having an exposure aperture and a shutter therefor; said cassette comprising a thin flat base member having means for fixedly holding two sheets of film, one against each face of the base, said base member being provided with an integral widened rim extending along its perimeter to define a shallow recess on each side of the base for receiving the film, a closure assembly including an apertured closure plate and a shutter for the aperture received in each of said recesses spaced from the film holding face of the base by at least film thickness, said rim being peripherally grooved and separate means on each side of the base rotatably holding each closure assembly to the base.

2. A film cassette for holding sensitized film in sheet form and adapted to expose successive areas of the film by rotational displacement of a closure having an exposure aperture and a shutter therefor; said cassette comprising a thin flat base member having means for fixedly holding two sheets of film, one against each face of the base, said base member being provided with an integral widened rim extending along its perimeter to define a shallow recess on each side of the base for receiving the film, a closure assembly including an apertured closure plate and a shutter for the aperture received in each of said recesses spaced from the film holding face of the base by at least film thickness, said rim being peripherally grooved, and separate means on each side of the base rotatably holding each closure assembly to the base, each of said means having a clamping portion engaging the base member rim including a lip engaged in the groove of the rim and a portion extending inwardly of the rim and overlying the outer surface of the closure assembly to define with the base member a channel within which said closure assembly is rotatably held.

3. A film holding cassette as set forth in claim 2 wherein said means for fixedly holding the two sheets of film comprises an integral boss extending from each side face of the said base member, said bosses being non-circular in form and enterable into correspondingly shaped openings in the film sheets to prevent rotation thereof.

4. A film holding cassette constructed as set forth in claim 2 wherein said base member is a disc whose film holding faces are provided with grooves for decreasing the weight of the base member, and said separate means for holding the closure assemblies comprise a pair of holding rings each having an annular flange overlying the outer edge of the rotatable closure and an inturned lip extending into the peripheral groove of said rim.

5. A film holding cassette constructed as set forth in claim 2 wherein said base member is provided with an annular shoulder on each of its film supporting faces spaced inwardly of said rim, said shoulder protruding from said face a distance equalling the thickness of said film to form a central circular pocket on each side of the base for receiving a film disc, said widened rim on the base member protruding beyond said shoulders a distance equalling the thickness of the closure assembly and defining a second and closure receiving pocket on each side of the base member positioned outwardly of the film receiving pocket, each closure assembly being received in one of said second pockets and rotatably held in a channel defined by said shoulder and said extended and closure overlying portion of the holding means.

6. A film cassette for holding sensitized film in sheet form and adapted to expose successive areas of said film by rotational displacement of a closure having an exposure aperture and a shutter therefor; said cassette comprising a thin flat base member having means for fixedly holding a sheet of film against one face, said base member being provided with an integral widened rim extending about its perimeter to define a shallow recess for receiving the film, a closure assembly including an apertured closure plate and a shutter for the aperture received within said recess spaced from the film supporting face of the base by a shoulder integral with the base member and of film thickness, and means for rotatably holding the closure assembly to the base, said means including clamping flanges engaging faces of the rim and a flange connecting web, one of said flanges extending inwardly of the rim and overlying the outer surface of the closure assembly to define with the said base member shoulder a channel within which said closure assembly is rotatably held.

WILFRED E. TAIT.
AUGUST W. STELLPFLUG.

REFERENCES CITED

The following references are of record in the file of this patent:

UNITED STATES PATENTS

| Number | Name | Date |
|---|---|---|
| 46,503 | Shute | Feb. 21, 1865 |
| 1,127,539 | Stern | Feb. 9, 1915 |
| 1,736,436 | Fuerst | Nov. 19, 1929 |
| 2,136,149 | Nuchterlein | Nov. 8, 1938 |
| 2,188,974 | Dilks | Feb. 6, 1940 |
| 2,446,200 | Tait | Aug. 3, 1948 |

FOREIGN PATENTS

| Number | Country | Date |
|---|---|---|
| 9,655 | Great Britain | July 27, 1886 |
| 202,046 | Great Britain | Aug. 13, 1923 |